Aug. 7, 1945.　　　F. B. SHEPARD　　　2,381,697
HUB STRUCTURE
Filed April 27, 1944　　2 Sheets-Sheet 1

Inventor
Frank B. Shepard.
By Wilfred E. Lawson
Attorney

Aug. 7, 1945.   F. B. SHEPARD   2,381,697
HUB STRUCTURE
Filed April 27, 1944   2 Sheets-Sheet 2
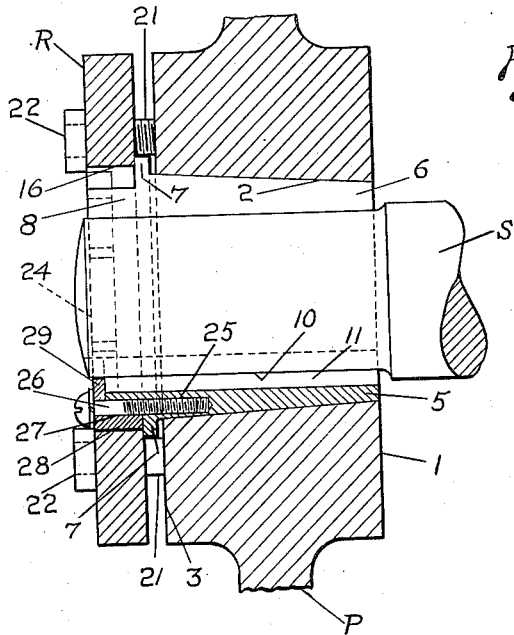
Fig. 3.
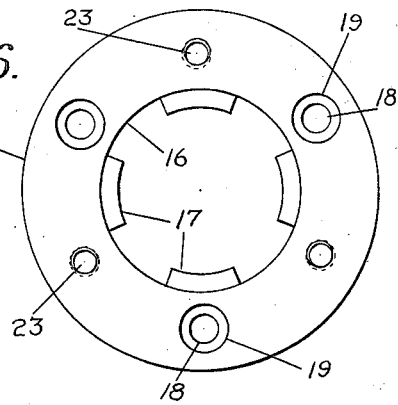
Fig. 6.
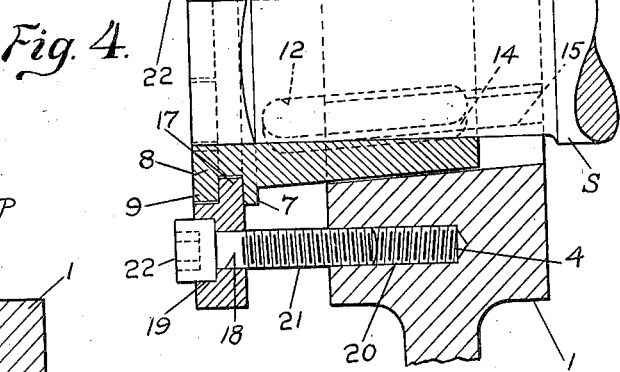
Fig. 4.
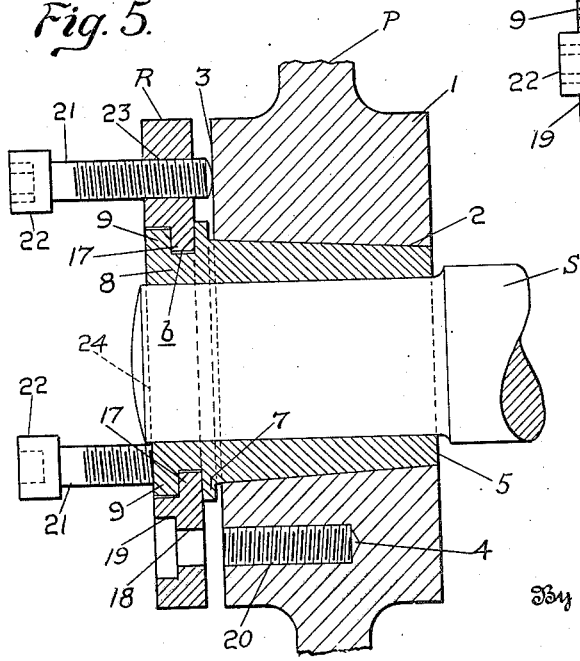
Fig. 5.
Fig. 7.
Inventor
Frank B. Shepard.
By Wilfred E. Lawson
Attorney Patented Aug. 7, 1945

2,381,697

UNITED STATES PATENT OFFICE 2,381,697

HUB STRUCTURE

Frank B. Shepard, Texon, Tex.

Application April 27, 1944, Serial No. 533,001

2 Claims. (Cl. 287—53)

This invention relates to a hub structure, and it is a particular object of the invention to provide a structure of this kind whereby the installation and servicing of pulleys, gears and the like may be expedited.

It is also an object of the invention to provide a hub structure which permits a pulley, gear or the like to be effectively locked in desired position upon a shaft and released therefrom with equal facility.

In modern industry, due to changes in work schedule and also to the change of products manufactured by various machines, it is often required that change be made in operating speeds which is generally accomplished by a change in pulley or gear ratios. It is, therefore, of extreme importance that the pulleys, gears or the like be provided with means whereby they can be readily and quickly interchanged and also to effectively lock the same upon a line shaft or the like in proper position. It is an object of the invention to provide a hub structure for such pulleys, gears or the like to enable such operations with the elimination of excessive down-time of machines and also with substantial elimination of extra time and labor.

The invention consists in the details of construction and in the combination and arrangement of the several parts of my improved hub structure whereby certain important advantages are attained, as will be hereinafter more fully set forth.

In order that my invention may be better understood, I will now proceed to describe the same with reference to the accompanying drawings, wherein:

Figure 3 is a sectional view taken substantially on the line 3—3 of Figure 1;

Figure 4 is a sectional view taken substantially on the line 4—4 of Figure 1, with the tapered sleeve and associated parts in initial assembly for application;

Figure 5 is a sectional view also taken substantially on the line 4—4 of Figure 1 but showing the tapered sleeve in applied position and the bolts in position for retracting the sleeve.

Figure 6 is a view in elevation of the retaining and pulling ring as herein embodied and unapplied; and Figure 7 is a view in perspective of the locking member herein comprised and unapplied.

Figure 1:
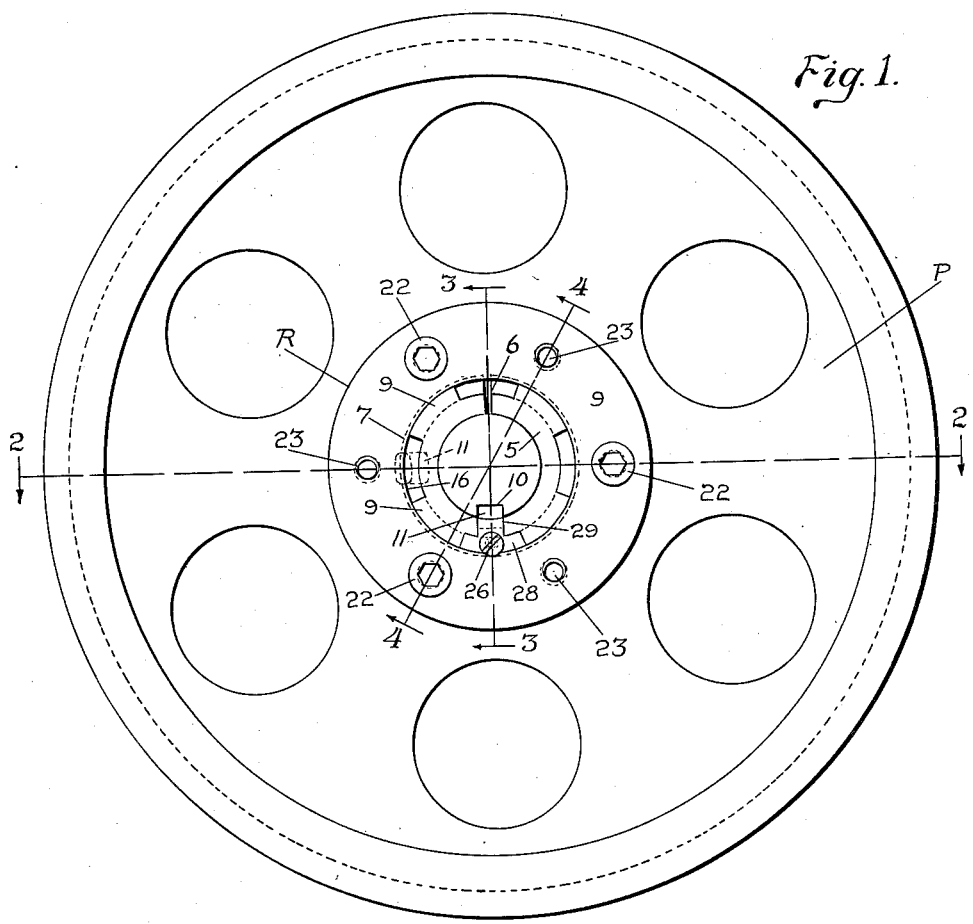
Figure 1 is a view in elevation illustrating a pulley having a hub structure constructed in accordance with an embodiment of the invention.
Figure 2:
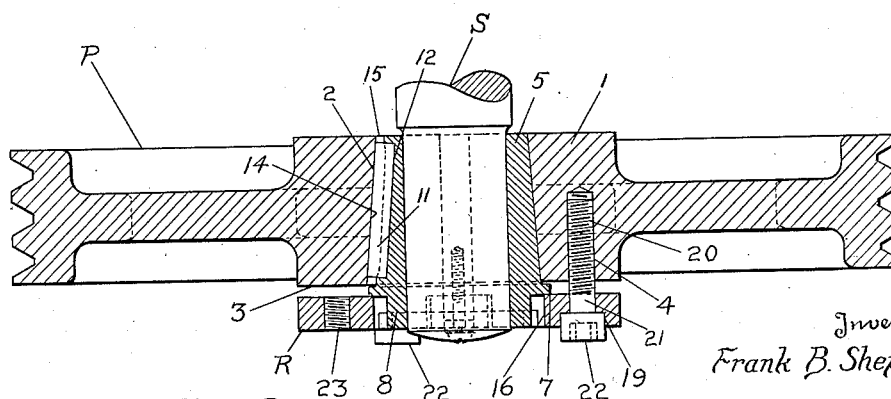
Figure 2 is a sectional view taken substantially on the line 2—2 of Figure 1.

In the embodiment of the invention as illustrated in the accompanying drawings, the invention is shown as being used in connection with a V-belt type pulley but it is to be stated that the invention is adapted to various types of flat pulleys and also to certain types of gears and the like. Therefore, in referring to pulleys, it is to be understood that this is to include all equivalent elements.

As disclosed in the accompanying drawings, P denotes a conventional type of V-belt pulley including a central body 1 having disposed therethrough a tapered bore 2. The face 3 of the central body 1 surrounding the larger end of the bore 2 is provided with a plurality of circumferentially and equidistantly spaced threaded openings 4, herein disclosed as three in number.

The tapered hub sleeve or bushing 5 is longitudinally split from end to end, as at 6, whereby the same may be contracted or expanded within certain limitations as may be required in practice.

The high extremity of the sleeve or bushing 5 is defined by an outstanding flange 7 for contact with the face 3 of the central body 1 to limit the extent of insertion of the sleeve or bushing within the bore 2.

The high extremity of the sleeve or bushing 5 in advance of the flange 7 is reduced from without to provide an extension 8, the periphery of which in cross section is straight and substantially parallel with the axial center of the sleeve or bushing 5. The outer portion of this extension 8 is provided with circumferentially spaced and outstanding arcuate lugs 9, herein disclosed as four in number, and which lugs 9 are of substantially duplicate dimensions.

At a point diametrical to the split 6, the sleeve or bushing 5 is provided therealong with the internal keyway 10 which receives the key 11 carried by the shaft S.

In about one-quarter relation to the split 6, the periphery of the sleeve or bushing 5 is provided therealong with a blind keyway 12 in which a key 14 is inserted and which key 14 in turn engages within a companion keyway 15 in the tapered bore 2 and open at each end.

Coacting with the extension 8 of the sleeve or bushing 5 is a retaining and pulling ring R. The central opening 16 of this ring R is of a diameter slightly in excess of the radius of each of the lugs 9 to provide a clearance, when the ring R is applied, as at b, to allow for a slight amount of play for the purpose of permitting the split sleeve or bushing 5 to expand and contract freely without exerting any strain on the ring R in any way and thereby permitting perfect alignment at all times.

This ring R at points equidistantly spaced in a circumferential direction therearound is provided with inwardly disposed arcuate lugs 17 which are arranged at and confined within the inner portion of the central opening 16 of the ring R. Each of these lugs 17 is of a length substantially equal to the space between adjacent lugs 9 carried by the extension 8 of the sleeve or bushing 5, so that as the ring R is applied in surrounding position upon said extension 8, the lugs 17 will readily pass between adjacent lugs 9, whereby the lugs 17 will be arranged inwardly of the lugs 9, so that upon slight turning movement of the ring R, the lugs 17 may be brought directly behind the lugs 9 and in which position the ring R is in its effective or working position, particularly when it is desired to impose pulling pressure on the sleeve or bushing 5.

The ring R is of a major diameter to materially overlie the adjacent face 3 of the central body 1 of the pulley P or the like when the ring is in applied position, and the ring R at equidistantly spaced points therearound is provided with the smooth openings 18, the outer end portion of each of which is countersunk, as at 19. In the present embodiment of the invention, these openings 18 are shown as three in number and these openings 18 are adapted to register with the properly positioned threaded sockets 20 in the face 3. A headed bolt 21 is inserted through each of the openings 18 and threads within the registering sockets 20.

The head 22 of the bolt is received within the countersink 19 and has direct contact with the base of said countersink whereby, as the bolt 21 is threaded within its socket, the ring R, together with its lugs 17, will contact with the adjacent high extremity of the sleeve or bushing 5 inwardly of the extension 8 and force said sleeve or bushing 5 within the bore 2 of the body 1, whereby the pulley P or the like will be effectively locked as desired upon the shaft S.

When it is desired to remove the pulley P or the like, the bolts 21 are removed and threaded through the openings 23, one of said openings being centrally positioned between each pair of adjacent openings 18. As these bolts 21 are threaded inwardly through the openings 23, they will have contact with the face 3 of the central portion of the pulley P or the like with the resultant pulling out of the sleeve or bushing 5 which in turn releases the grip on the shaft S to allow the pulley P or the like to be freely removed by hand and without requiring special tools.

It is believed to be apparent that the ring R serves the purpose of retaining the split sleeve or bushing 5 in proper position at all times and also for the purpose of withdrawing such sleeve or bushing 5 when necessary. At this time it is to be pointed out that the lugs 17 of the ring R are of such dimensions to provide for a clearance c between said lugs and the adjacent portion of the extension 8 so that no hindrance or obstruction is offered to the desired expansion or contraction of the sleeve or bushing 5.

As illustrated in the accompanying drawings, the keyway 10 opens midway between two adjacent lugs 9 and the high end face 24 of the sleeve or bushing 5 surrounding the extension 8 is provided with a threaded socket 25 in which engages a bolt 26. This bolt 26 freely passes from without through an opening 27 provided in an arcuate locking plate or member 28 which is snugly received within the space between the lugs 9 at opposite sides of the keyway 10.

The central portion of this plate 28 is provided with an inwardly directed lug 29 and which also overlies and contacts with the adjacent end of the key 11, whereby means are provided for locking the retaining ring R in proper position and also to prevent the key 11 from working out endwise, thus eliminating the necessity of using a conventional set-screw for such purpose.

In the commercial exploitation of the invention, it is desirable to distribute the same with a number of sleeves or bushings 5 with the outer or taper dimensions of all of such sleeves being the same but with the diameter of the bore varying in order to allow for the use of the invention with shafts of different sizes within a certain range. The object of this is to simplify the stock of parts.

What is claimed is:

1. Means for securing to a shaft a mechanical element having a hub opening, such as a pulley, gear, wheel and the like, comprising a sleeve for surrounding the shaft and for insertion within the hub opening, means for locking the sleeve to the shaft, means for locking the sleeve to the element, one extremity of the sleeve being provided with an extension, a retaining and pulling ring freely surrounding said extension and provided with inwardly disposed lugs for contact with the adjacent end of the sleeve when pressure is imposed upon the ring member, outstanding spaced lugs carried by the outer extremity of the extension and behind which the lugs of the ring member are to be positioned for contact to impose pull upon the sleeve when pull is imposed upon the ring member, means for imposing push or pull upon the ring member, and means carried by the sleeve and engaging between adjacent lugs of the ring member to lock the ring member against rotation around the sleeve.

2. A structure as set forth in claim 1, wherein the means for locking the sleeve to the element comprises registering keyways in the sleeve and element, and a key interfitting in said registering keyways, the means engaging between adjacent lugs to hold the ring member against rotation also providing means to hold the key in place.

FRANK B. SHEPARD.